US011940207B2

(12) United States Patent
Yang et al.

(10) Patent No.: US 11,940,207 B2
(45) Date of Patent: Mar. 26, 2024

(54) DRAWER ASSEMBLY AND REFRIGERATOR HAVING THE SAME

(71) Applicant: HAIER SMART HOME CO., LTD., Qingdao (CN)

(72) Inventors: Falin Yang, Qingdao (CN); Zhiguo Xu, Qingdao (CN); Min Liu, Qingdao (CN); Baochun Ju, Qingdao (CN); Xiaofa Wang, Qingdao (CN)

(73) Assignee: HAIER SMART HOME CO., LTD., Qingdao (CN)

( * ) Notice: Subject to any disclaimer, the term of this patent is extended or adjusted under 35 U.S.C. 154(b) by 612 days.

(21) Appl. No.: 17/259,915

(22) PCT Filed: Sep. 10, 2019

(86) PCT No.: PCT/CN2019/105150
§ 371 (c)(1),
(2) Date: Jan. 12, 2021

(87) PCT Pub. No.: WO2020/048549
PCT Pub. Date: Mar. 12, 2020

(65) Prior Publication Data

US 2021/0293471 A1 Sep. 23, 2021

(30) Foreign Application Priority Data

Sep. 3, 2018 (CN) ........................ 201811019919.X

(51) Int. Cl.
*F25D 25/02* (2006.01)
*E05F 5/08* (2006.01)
*E05F 5/10* (2006.01)

(52) U.S. Cl.
CPC .............. *F25D 25/025* (2013.01); *E05F 5/08* (2013.01); *E05F 5/10* (2013.01); *E05Y 2900/31* (2013.01)

(58) Field of Classification Search
CPC ........ F25D 25/025; A47B 88/473; E05F 5/10; E05Y 2900/31
See application file for complete search history.

(56) References Cited

U.S. PATENT DOCUMENTS

2011/0080080 A1* 4/2011 Zimmer ............... A47B 88/467 312/319.1
2013/0088132 A1* 4/2013 Hammerle ............. A47B 88/46 312/319.1

(Continued)

FOREIGN PATENT DOCUMENTS

CN 2109123 U 7/1992
CN 2208365 Y 9/1995

(Continued)

*Primary Examiner* — Daniel J Rohrhoff
(74) *Attorney, Agent, or Firm* — Cheng-Ju Chiang

(57) ABSTRACT

A drawer assembly and a refrigerator, the drawer assembly comprising a drawer body, a slideway assembly for pushing and pulling the drawer body, and a damping reset unit matching the drawer body and being arranged on the sliding channel assembly, the damping reset unit comprising an elastic member for driving the drawer body to reset from an open state to a closed state and a damping member for reducing the reset speed of the elastic member. A refrigerator is provided with the drawer assembly. The arrangement of the damping reset unit enables the process of closing the drawer body to not require the application of external force during the entire process, and the arrangement of the damping member makes the rebound process of the drawer body much gentle, avoiding the vibration, noise, and damage that may be produced during rapid rebound.

10 Claims, 3 Drawing Sheets

(56) References Cited

U.S. PATENT DOCUMENTS

| | | | | |
|---|---|---|---|---|
| 2014/0294328 | A1* | 10/2014 | Pecar | A47B 88/467 384/20 |
| 2015/0374125 | A1* | 12/2015 | Goetz | A47B 88/49 312/319.1 |
| 2016/0153699 | A1* | 6/2016 | Lee | F25D 25/025 312/270.3 |
| 2017/0265644 | A1* | 9/2017 | Fischer | F16C 29/005 |
| 2017/0367480 | A1* | 12/2017 | Dickerson | A47B 88/467 |
| 2020/0190882 | A1* | 6/2020 | Bantle | E05F 3/00 |
| 2020/0224959 | A1* | 7/2020 | Wantland | F25D 25/025 |
| 2021/0293471 | A1* | 9/2021 | Yang | E05F 5/10 |
| 2023/0003069 | A1* | 1/2023 | Liang | E05F 3/02 |

FOREIGN PATENT DOCUMENTS

| | | | |
|---|---|---|---|
| CN | 201051979 | Y | 4/2008 |
| CN | 106263698 | A | 1/2017 |
| CN | 205885097 | U | 1/2017 |
| CN | 207247709 | U | 4/2018 |
| CN | 109708413 | A | 5/2019 |
| JP | 2013-32877 | A | 2/2013 |

* cited by examiner

DRAWER ASSEMBLY AND REFRIGERATOR HAVING THE SAME

CROSS REFERENCE TO RELATED APPLICATIONS

The present application is a 35 U.S.C. § 371 National Phase conversion of International (PCT) Patent Application No. PCT/CN2019/105150, filed on Sep. 10, 2019, which claims priority of Chinese Patent Application No. 201811019919.X, filed on Sep. 3, 2018, the disclosure of which is incorporated by reference herein. The PCT International Patent Application was filed and published in Chinese.

TECHNICAL FIELD

The present invention relates to the technical field of refrigerators, and more specifically to a drawer assembly and a refrigerator having the same.

BACKGROUND

A conventional drawer assembly usually uses rollers in engagement with slideways to ensure smooth operation of the drawer assembly. However, during the entire stroke of the drawer, a manual force is needed for operation. When such a drawer assembly is used, the user does not have sufficient comfortable experience. Furthermore, since the roller-slideway structure is relatively simple, stabile operation cannot be ensured. In view of the above, it is necessary to improve the conventional drawer assembly.

SUMMARY

An object of the present invention is to provide a drawer assembly which does not require application of a force during the whole closing process and which moves smoothly and slowly during automatic closing, and a refrigerator having such a drawer assembly.

To achieve the above object of the present invention, the present invention provides a drawer assembly, comprising a drawer body and a slideway assembly on which the drawer body is pushed and pulled, wherein the drawer assembly further comprises a damping reset unit matching the drawer body and being arranged on the slideway assembly, and wherein the damping reset unit comprises an elastic member that drives the drawer body to reset from an open state to a closed state, and a damping member that reduces the reset speed of the elastic member.

Optionally, wherein the damping member has a housing fixed relative to the slideway assembly and a piston rod that is telescopic relative to the housing along a push-pull direction of the drawer body and generates damping with the housing when it telescopes, and a deformation direction of the elastic member is consistent with the push-pull direction of the drawer body.

Optionally, wherein one end of the elastic member is fixed on the housing, the other end is fixed on the piston rod, and the elastic member has a minimum stretch when the drawer body is in a closed state.

Optionally, wherein the piston rod is provided with a retaining portion protruding toward the drawer body, the drawer body is provided with a linkage which is fitted with the retaining portion so that the piston rod extends relative to the housing as the drawer body is opened, and the elastic member generates a return force for returning the drawing body when the piston rod is in an extended state.

Optionally, wherein the damping member has a locking structure that keeps the drawer body in the open state.

Optionally, wherein the locking structure comprises a clamping portion disposed on the piston rod and a snap portion disposed on the housing that configured to engage with the clamping portion to lock the position of the drawer body relative to the slideway assembly.

Optionally, wherein the drawer body is provided with a sliding portion on both sides, the slideway assembly is provided with a sliding groove that is slidably engaged with the sliding portion, and the sliding groove is disposed along the push-pull direction of the drawer body and has a horizontally-disposed horizontal section and an inclined section formed obliquely extending downward from a rear end of the horizontal section.

Optionally, wherein the damping member has an unstretched initial state and a locked state in which the damping member is stretched and locked; the sliding portion has a first roller located on a rear side; when the damping member is released from the locked state, the elastic member returns until the damping member gets into the initial state and the first roller is located at the inclined section, and the drawer body continues to return under its own weight until it is in the closed state.

Optionally, wherein a front end of the sliding groove is provided with a second roller, the sliding portion has a sliding rail engaging with the second roller, and the sliding rail is located on both sides of the drawer body, and the sliding rail moves in the sliding groove and in rolling engagement with the second roller.

To achieve the above object of the present invention, the present invention provides a refrigerator with the above drawer assembly.

Technical effects of the present invention are as follows: the damping reset unit is arranged such that an external force needn't be applied in the whole closing process of the drawer body, and the drawer body can automatically rebound after the external force is only needed to release the locked state of the damping reset unit, which improves the user's use experience. Furthermore, the damping reset unit is provided with the damping member, and the arrangement of the damping member makes the rebound process of the drawer body smoother and avoids the vibration, noise and damages that might occur when the drawer body rebounds quickly.

DETAILED DESCRIPTION

Figures are only used for an illustration purpose and not construed as limiting the present invention; to better illustrate embodiments, some parts of the figures are omitted, enlarged or reduced, and do not represent the size of an actual product; those skilled in the art may understand some known structures and depictions thereof might be omitted from the figures.

EMBODIMENTS

Figure 1:
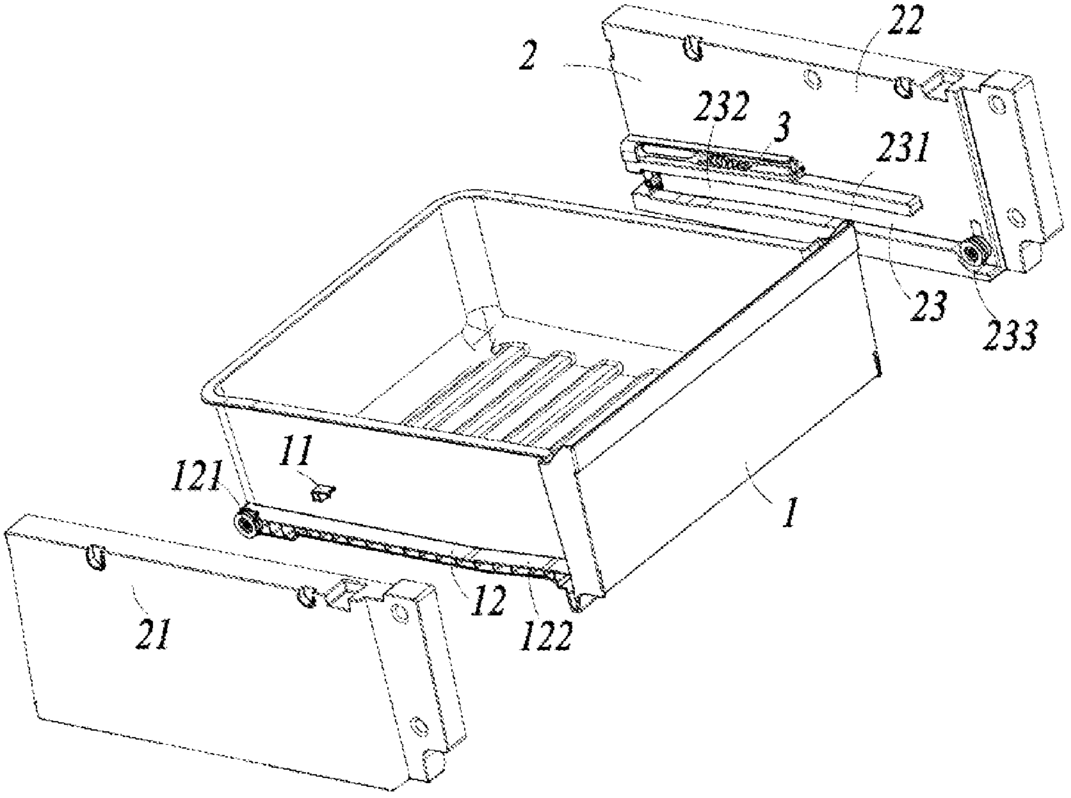
FIG. 1 is an exploded view of a drawer assembly according to a preferred embodiment of the present invention.
Figure 2:
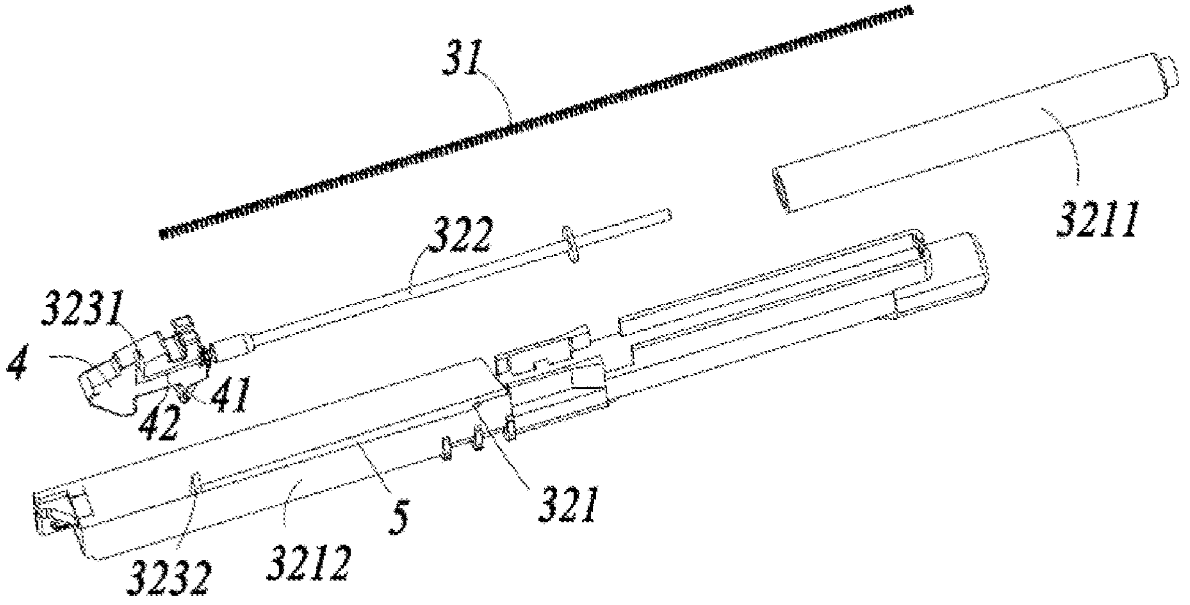
FIG. 2 is an exploded view of a damping reset unit.
Figure 3:
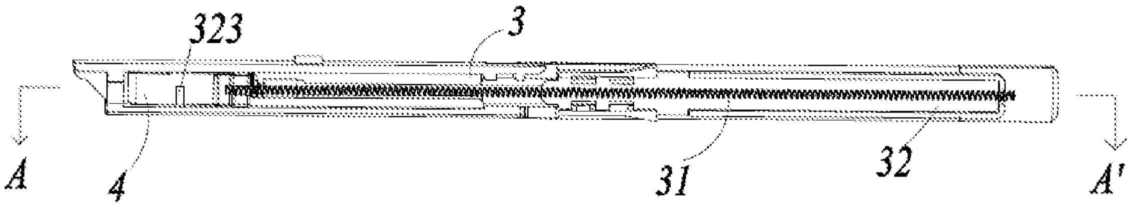
FIG. 3 is an overall schematic view of the damping reset unit.
Figure 4:
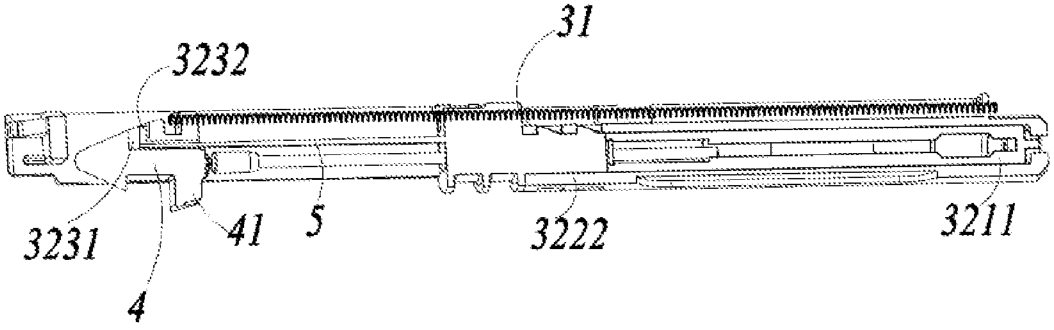
FIG. 4 is a cross-sectional view of the damping reset unit taken along line A-A' of FIG. 3.

A drawer assembly as shown in FIG. 1 through FIG. 4 comprises a drawer body 1 and a slideway assembly 2 on which the drawer body 1 is pushed and pulled. The drawer assembly further comprises a damping reset unit 3 arranged on the slideway assembly 2 and fitted with the drawer body 1. The damping reset unit 3 comprises an elastic member 31 that drives the drawer body 1 to reset from an open state to a closed state, and a damping member 32 that reduces the reset speed of the elastic member 31.

The damping member 32 has a housing 321 fixed relative to the slideway assembly 2 and a piston rod 322 that is telescopic relative to the housing 321 along a push-pull direction of the drawer body 1 and generates damping with the housing 321 when it telescopes. A deformation direction of the elastic member 31 is consistent with the push-pull direction of the drawer body 1.

One end of the elastic member 31 is fixed on the housing 321, and the other end is fixed on the piston rod 322. The elastic member 31 has a minimum stretch when the drawer body 1 is in a closed state.

In the present embodiment, the minimum stretch of the elastic member 31 means that the elastic member 31 is in a non-compressed state.

The piston rod 322 is fixed with a connecting piece 4, the connecting piece 4 is provided with a retaining portion 41 protruding toward the drawer body 1, and the drawer body 1 is provided with a linkage 11 which is fitted with the retaining portion 41 so that the piston rod 322 extends relative to the housing 321 as the drawer body 1 is opened. The elastic member 31 generates a return force for returning the drawing body 1 when the piston rod 322 is in an extended state.

Preferably, the slideway assembly 2 comprises a left slideway assembly 21 and a right slideway assembly 22, and the left slideway assembly 21 and the right slideway assembly 22 are respectively provided with the damping reset unit 3 to ensure the stability when the drawer body 1 is automatically closed. In some alternative implementations, the damping reset unit 3 may also be disposed on a side of only one of the left slideway assembly 21 and the right slideway assembly 22.

The damping member 32 has a locking structure 323 that keeps the drawer body 1 in an open state.

The housing 321 comprises a cylinder 3211 telescopically matched with the piston rod 322 and a base 3212 for fixing the damping member 32 on the slideway assembly 2.

The locking structure 323 comprises a clamping portion 3231 disposed on the piston rod 322 and a snap portion 3232 disposed on the base 3212 and configured to cooperate with the clamping portion 3231 to lock the position of the drawer body 1 relative to the slideway assembly 2.

Preferably, the base 3212 is provided with a guide rail 5 supporting the piston rod 322, the connecting piece 4 is further provided with a guide groove 42 matingly connected with the guide rail 5, the guide groove 42 is recessed towards inward the connecting piece 4 in a transverse direction and extends in the push-pull direction of the drawer body 1, the clamping portion 3231 extends from the guide groove 42 towards an upper portion of the connecting piece 4 until running through the connecting piece 4, and the snap portion 3232 is an elastic protrusion disposed at a front end of the guide rail 5 and protruding upward; when the piston rod 322 is drawn outward to the position of the connecting piece 4 to correspond to the snap portion 3232, the connecting piece 4 compresses the snap portion 3232 and presses outward until the position of the snap portion 3232 corresponds to the snap portion 3231, and the snap portion 3232 ejects out and is caught in the caching portion 3231 to complete the locking of the locking structure 323.

The drawer body 1 is provided with a sliding portion 12 on both sides, the slideway assembly 2 is provided with a sliding groove 23 that is slidably engaged with the sliding portion 12, and the sliding groove 23 is disposed along the push-pull direction of the drawer body 1 and has a horizontally-disposed horizontal section 231 and an inclined section 232 formed obliquely extending downward from a rear end of the horizontal section 231.

The damping member 32 has an unstretched initial state and a locked state in which the damping member 32 is stretched and locked. The sliding portion 12 has a first roller 121 located on the rear side. When the damping member 32 is released from the locked state, the elastic member 31 returns until the damping member 32 gets into the initial state and the first roller 121 is located at the inclined section 232, and the drawer body 1 continues to return under its own weight until it is in the closed state.

Preferably, when the drawer body 1 is in the closed state, the retaining portion 41 and the linkage 11 are spaced apart by a certain distance along the push-pull direction of the drawer body 1, so that after the drawer body 1 is drawn out by a certain distance from the closed state, the retaining portion 41 abuts against the linkage 11.

In some alternative embodiments, when the drawer body 1 is in the closed state, the retaining portion 41 abuts against or is fixedly connected to the linkage 11 so that the drawer body 1, when pulled out, drives the damping member 32 to stretch. In this case, an opening and closing range of the drawer body 1 is a stretching range of the damping member 32.

After the drawer body 1 is pulled out by a certain distance from the closed state, the retaining portion 41 abuts against the linkage 11 and drives the piston rod 322 to stretch outward in the push-pull direction of the drawer body 1 until the damping member 32 is in the locked state. At this time, the first roller 121 moves from the inclined section 232 to the horizontal section 231, the drawer body 1 is locked and in the open state. When the drawer body 1 needs to be closed, the drawer body 1 is pushed inward until the damping member 32 automatically rebounds after being released from the locked state, and drives the drawer body 1 to retract. After the damping reset unit 3 has rebounded, the roller 121 is located at the inclined section 232, and the drawer body 1 slides down along the inclined section 232 under its own gravity until the drawer body 1 gets into closed state.

With such an arrangement, the drawing range of the drawer body 1 may not be restricted by the expansion and contraction range of the damping reset unit 3, which reduces the requirements for the size of the damping reset unit 3, saves the space occupied by the damping reset unit 3, and saves the manufacturing cost.

Preferably, a front end of the sliding groove 23 is provided with a second roller 233, the sliding portion 12 has a sliding rail 122 engaging with the second roller 233, and the sliding rail 122 is located on both sides of the drawer body 1, and the sliding rail 122 moves in the sliding groove 23 and in rolling engagement with the second roller 233. With such an arrangement, the drawer body 1 meets less resistance during the pushing and pulling process, and operates more smoothly.

In the present embodiment, the damping reset unit 3 is arranged such that an external force needn't be applied in the whole closing process of the drawer body 1, and the drawer body 1 can automatically rebound after the external force is only needed to release the locked state of the damping reset unit 3, which improves the user's use experience. Furthermore, the damping reset unit 3 is provided with the damping member 31, and the damping member 31 functions to make the automatic rebound process of the drawer body 1 smoother and avoid the vibration, noise and damage that might occur when the drawer body 1 rebounds quickly.

Preferably, the present embodiment provides a refrigerator with the above drawer assembly.

What is claimed is:

1. A drawer assembly, comprising a drawer body and a slideway assembly on which the drawer body is pushed and pulled, wherein the drawer assembly further comprises a damping reset unit matching the drawer body and being arranged on the slideway assembly, and wherein the damping reset unit comprises an elastic member that drives the drawer body to reset from an open state to a closed state, and a damping member that reduces the reset speed of the elastic member;

wherein the damping member has a housing fixed relative to the slideway assembly and a piston rod that is telescopic relative to the housing along a push-pull direction of the drawer body and generates damping with the housing when it telescopes, and a deformation direction of the elastic member is consistent with the push-pull direction of the drawer body;

wherein one end of the elastic member is fixed on the housing, the other end is fixed on the piston rod, and the elastic member has a minimum stretch when the drawer body is in a closed state;

wherein the piston rod is provided with a retaining portion protruding toward the drawer body, the drawer body is provided with a linkage which is fitted with the retaining portion so that the piston rod extends relative to the housing as the drawer body is opened, and the elastic member generates a return force for returning the drawing body when the piston rod is in an extended state;

wherein the damping member has a locking structure that keeps the drawer body in the open state.

2. The drawer assembly according to claim 1, wherein the locking structure comprises a clamping portion disposed on the piston rod and a snap portion disposed on the housing that configured to engage with the clamping portion to lock the position of the drawer body relative to the slideway assembly.

3. The drawer assembly according to claim 1, wherein the drawer body is provided with a sliding portion on both sides, the slideway assembly is provided with a sliding groove that is slidably engaged with the sliding portion, and the sliding groove is disposed along the push-pull direction of the drawer body and has a horizontally-disposed horizontal section and an inclined section formed obliquely extending downward from a rear end of the horizontal section.

4. The drawer assembly according to claim 3, wherein the damping member has an unstretched initial state and a locked state in which the damping member is stretched and locked; the sliding portion has a first roller located on a rear side; when the damping member is released from the locked state, the elastic member returns until the damping member gets into the initial state and the first roller is located at the inclined section, and the drawer body continues to return under its own weight until it is in the closed state.

5. The drawer assembly according to claim 3, wherein a front end of the sliding groove is provided with a second roller, the sliding portion has a sliding rail engaging with the second roller, and the sliding rail is located on both sides of the drawer body, and the sliding rail moves in the sliding groove and in rolling engagement with the second roller.

6. A refrigerator having the drawer assembly according to claim 1.

7. The refrigerator according to claim 6, wherein the locking structure comprises a clamping portion disposed on the piston rod and a snap portion disposed on the housing that configured to engage with the clamping portion to lock the position of the drawer body relative to the slideway assembly.

8. The refrigerator according to claim 6, wherein the drawer body is provided with a sliding portion on both sides, the slideway assembly is provided with a sliding groove that is slidably engaged with the sliding portion, and the sliding groove is disposed along the push-pull direction of the drawer body and has a horizontally-disposed horizontal section and an inclined section formed obliquely extending downward from a rear end of the horizontal section.

9. The refrigerator according to claim 8, wherein the damping member has an unstretched initial state and a locked state in which the damping member is stretched and locked; the sliding portion has a first roller located on a rear side; when the damping member is released from the locked state, the elastic member returns until the damping member gets into the initial state and the first roller is located at the inclined section, and the drawer body continues to return under its own weight until it is in the closed state.

10. The refrigerator according to claim 8, wherein a front end of the sliding groove is provided with a second roller, the sliding portion has a sliding rail engaging with the second roller, and the sliding rail is located on both sides of the drawer body, and the sliding rail moves in the sliding groove and in rolling engagement with the second roller.

* * * * *